US009246735B2

(12) United States Patent
Sun et al.

(10) Patent No.: US 9,246,735 B2
(45) Date of Patent: Jan. 26, 2016

(54) EQUALIZING A SIGNAL MODULATED USING A 5QAM MODULATION FORMAT

(71) Applicant: Infinera Corporation, Sunnyvale, CA (US)

(72) Inventors: Han H. Sun, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 385 days.

(21) Appl. No.: 13/931,369

(22) Filed: Jun. 28, 2013

(65) Prior Publication Data

US 2014/0308039 A1 Oct. 16, 2014

Related U.S. Application Data

(60) Provisional application No. 61/812,566, filed on Apr. 16, 2013.

(51) Int. Cl.
*H04J 14/02* (2006.01)
*H04B 10/00* (2013.01)
*H04B 10/04* (2006.01)
*H04B 10/12* (2006.01)
*H04B 10/06* (2006.01)
*H04L 27/34* (2006.01)
(Continued)

(52) U.S. Cl.
CPC .......... *H04L 27/3444* (2013.01); *H04B 10/541* (2013.01); *H04B 10/612* (2013.01)

(58) Field of Classification Search
USPC ............ 398/140, 79, 182, 184, 188, 202, 205
See application file for complete search history.

(56) References Cited

U.S. PATENT DOCUMENTS

| 2005/0163242 A1* | 7/2005 | Ungerboeck | H04L 1/0057 375/261 |
| 2007/0147542 A1* | 6/2007 | Schmidt | H03M 13/251 375/298 |
| 2008/0317168 A1* | 12/2008 | Yang | H04B 7/026 375/298 |

(Continued)

OTHER PUBLICATIONS

Fang, Dong, Multilevel Linear Network Coded Modulation for the Wireless Cloud, The Tenth International Symposium on Wireless Communication System 2013.*

(Continued)

*Primary Examiner* — David Payne
*Assistant Examiner* — Pranesh Barua
(74) *Attorney, Agent, or Firm* — Harrity & Harrity LLP; David L. Soltz (57) ABSTRACT

An optical system may include an optical transmitter or an optical receiver. The optical transmitter may include a laser to provide an input signal, a first digital signal processor (DSP) to receive a data signal, provide non-rotated and rotated symbols corresponding to the data signal, and provide digital signals corresponding to the non-rotated and the rotated symbols to cause one or more digital to analog converts to convert the digital signals to analog signals. The optical transmitter may further provide a modified 5 quadrature amplitude modulation (5QAM) signal based on the analog signals and the input signal. A constellation map of the modified 5QAM signal may include all constellation points of a 16QAM signal. The optical receiver may include a second DSP to receive components associated with the 5QAM signal, filter the components, reduce phase noise of the 5QAM signal, and provide data associated with the 5QAM signal.

20 Claims, 6 Drawing Sheets

(51) Int. Cl.
  *H04B 10/61* (2013.01)
  *H04B 10/54* (2013.01)

(56) References Cited

U.S. PATENT DOCUMENTS

| | | | | |
|---|---|---|---|---|
| 2009/0238580 A1* | 9/2009 | Kikuchi | ............ | H04B 10/25137 398/192 |
| 2010/0002751 A1* | 1/2010 | Dent | ................... | H04L 27/3416 375/141 |
| 2011/0217043 A1* | 9/2011 | Pfau | ........................ | H04J 14/06 398/65 |
| 2011/0318017 A1* | 12/2011 | Sun | ...................... | H04B 10/611 398/154 |
| 2014/0003824 A1* | 1/2014 | Sun | .................. | H04B 10/25073 398/202 |
| 2014/0140432 A1* | 5/2014 | Weinholt | ................ | H04L 5/003 375/269 |
| 2015/0010304 A1* | 1/2015 | Deore | .................... | H04B 10/27 398/48 |
| 2015/0188641 A1* | 7/2015 | Awadalla | ............ | H04L 27/3818 398/202 |

OTHER PUBLICATIONS

Fang, Dong, Linear Physical-Layer Network Coding Over Hybrid Finite Ring for Rayleigh Fading Two-Way Relay Channels, IEEE Transactions on Communications, vol. 62, No. 9, Sep. 2014.*
Koike-Akino, Toshiaki, Two-Way Relaying with Network Coding for Frequency-Selective Fading Channels, IEEE, 2008.*
Fang, Dong, Multilevel Coded Linear Physical-layer Network Coding with Extended Mapping in Galois Field for Rayleigh fading Two-way Realy Channels, IEEE 24th International Symposium on Personl, Indoor and Mobile Radio CommunicationsL Fundamental and PHY Track, 2013.*

* cited by examiner

EQUALIZING A SIGNAL MODULATED USING A 5QAM MODULATION FORMAT

RELATED APPLICATION

This application claims priority to U.S. Provisional Patent Application No. 61/812,566, filed Apr. 16, 2013, the disclosure of which is incorporated by reference herein.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The receiver PIC may include a polarization beam splitter (PBS) to receive an optical signal (e.g., a WDM signal), split the received optical signal, and provide two optical signals (e.g., associated with orthogonal polarizations) associated with the received optical signal. The receiver PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, the transmitter may modulate a phase of a signal in order to convey data (via the signal) to the receiver where the signal may be demodulated such that data, included in the signal, may be recovered. A particular modulation format (e.g., phase-shift keying (PSK), quadrature amplitude modulation (QAM) or the like) may be used to modulate the input signal. Different modulation formats correspond to different distances that the input signal may be transmitted. Further, different modulation formats may result in different bit error rates (BERs) associated with the signal. A particular modulation format may be selected based on a trade-off between BER and transmission distance.

SUMMARY

According to some possible implementations, an optical system may include an optical transmitter having a laser to provide an input signal and a digital signal processor (DSP) to receive a data signal, provide non-rotated symbols corresponding to components of the data signal. The non-rotated symbols may correspond to first points in a constellation map. The DSP may rotate the non-rotated symbols to provide rotated symbols. The rotated symbols may correspond to second points in the constellation map that are rotated relative to the first points of the constellation map. The DSP may provide digital signals corresponding to the non-rotated symbols and the rotated symbols to cause one or more digital to analog converts (DACs) to convert the digital signals to corresponding analog signals. The optical transmitter may include one or more modulators to receive the input signal and the analog signals and provide a modified 5 quadrature amplitude modulation (5QAM) output signal based on the input signal and the analog signals. A constellation map of the modified 5QAM output signal may include all constellation points of a 16QAM signal.

According to some possible implementations, an optical system may include an optical receiver having a DSP to receive components associated with a modified 5QAM signal provided by an optical transmitter. A constellation map of the modified 5QAM output signal may include all constellation points of a 16QAM signal. The DSP may filter the components of the modified 5QAM signal and reduce a phase noise of the modified 5QAM signal to equalize the modified 5QAM signal, form a 5QAM signal associated with the modified 5QAM signal, based on equalizing the modified 5QAM signal, and provide data associated with the 5QAM signal based on forming the 5QAM signal.

According to some possible implementations, an optical system may include an optical transmitter having a laser to provide an input signal and a first DSP to receive a data signal, provide non-rotated symbols corresponding to components of the data signal. The non-rotated symbols may correspond to first points in a constellation map. The first DSP may rotate the non-rotated symbols to provide rotated symbols. The rotated symbols may correspond to second points in the constellation map that are rotated relative to the first points of the constellation map. The first DSP may provide digital signals corresponding to the non-rotated symbols and the rotated symbols to cause one or more DACs to convert the digital signals to corresponding analog signals. The optical transmitter may include one or more modulators to receive the input signal and the analog signals and provide a modified 5QAM output signal based on the input signal and the analog signals. A constellation map of the modified 5QAM output signal may include all constellation points of a 16QAM signal.

The optical system may include a second DSP to receive components associated with the 5QAM output signal, filter the components of the 5QAM output signal and reduce a phase noise of the 5QAM output signal to equalize the 5QAM output signal, and provide data associated with the 5QAM output signal based on equalizing the components of the 5QAM output signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

In an optical communications system, a dual-pol 5QAM modulation format may be selected to modulate a signal in order to provide a particular balance between spectral efficiency and transmission distance of the signal.

Systems and/or methods, as described herein, may equalize a dual-pol 5QAM signal (e.g., a signal that is modulated using a 5QAM modulation format that delivers 5 bits per dual-pol symbol) such that data from the signal may be recovered by a receiver. For example, a receiver may equalize the dual-pol 5QAM signal (hereinafter referred to as a "5QAM signal") by filtering the 5QAM signal using an equalization algorithm formatted to equalize a dual-pol 16QAM signal (e.g., a constant modulus algorithm (CMA), a least means square (LMS) algorithm, or the like). In some implementations, the systems and/or methods may further equalize the 5QAM signal by correcting for phase noise introduced by Tx and Rx lasers.

Figure 1:
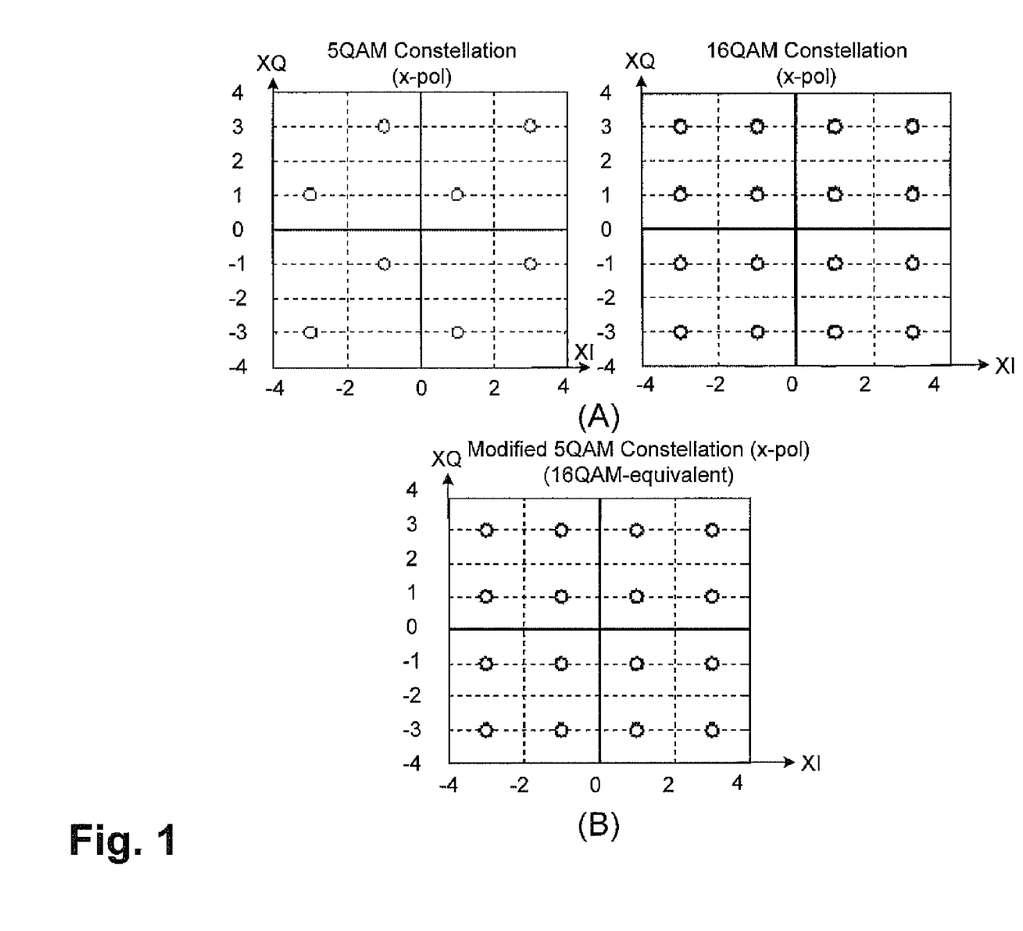
FIG. 1 illustrates an overview of an example implementation described herein.

FIG. 1 illustrates an example overview of an implementation as described herein. As shown in (A), a 5QAM constellation diagram (e.g., a constellation diagram of a 5QAM signal associated with a particular polarization, such as an x-pol or a y-pol) may include a subset of constellation points included in a dual-pol 16QAM constellation diagram (e.g., a constellation diagram of a dual pol 16QAM signal associated with a particular polarization). For example, the dual-pol 16QAM signal may be associated with a dual-pol 16QAM modulation format that delivers 8 bits per dual-pol symbol versus the 5 bits per dual-pol symbol of the 5QAM modulation format.

In some implementations, the systems and/or methods may modulate the 5QAM signal by continuously rotating the 5QAM signal by 90 degrees (e.g., to form a modified 5QAM signal). In some implementations, the constellation diagram of a modified 5QAM signal may include first constellation points (e.g., constellation points of the 5QAM constellation diagram) in addition to second constellation points (e.g., constellation points of the 5QAM constellation diagram after being rotated 90 degrees).

As shown in (B), the constellation diagram of the modified 5QAM signal may include constellation points of the 16QAM constellation diagram (e.g., as a result of the continuous rotation of the 5QAM signal). That is, the modified 5QAM signal may correspond to an equivalent 16QAM signal (e.g., a 16QAM-equivalent signal). For example, at different instances in time, the 16QAM-equivalent signal may include either rotated constellation points or non-rotated constellation points such that over a period of time, the 16QAM-equivalent signal may include both rotated and non-rotated constellation points.

Once the 5QAM signal has been modulated to form the 16QAM-equivalent signal, the 16QAM-equivalent signal may be equalized (e.g., using equalization algorithms formatted for the 16QAM signal) to form an equalized signal. The equalized signal (while in the form of the 16QAM-equivalent signal) may be converted back to a 5QAM signal and may be provided to a recovery component to recover data, associated with the 5QAM signal.

In some implementations, the 5QAM signal may include components associated with a first polarization (e.g., an X polarization (x-pol)) and components associated with a second polarization (e.g., a Y polarization (y-pol)). While a first polarization may be described herein as the X polarization and a second polarization may be described herein as the Y polarization, in some implementations, the first polarization may correspond to the Y polarization and the second polarization may correspond to the X polarization. In some implementations, components, described as having the X polarization, may have the Y polarization. In some implementations, components, described as having the Y polarization, may have the X polarization. In some implementations, the X polarization may correspond to a transverse magnetic (TM) polarization and the Y polarization may correspond to a transverse electric (TE) polarization. Alternatively, the Y polarization may correspond to the TM polarization and the X polarization may correspond to the TE polarization.

Figure 2:
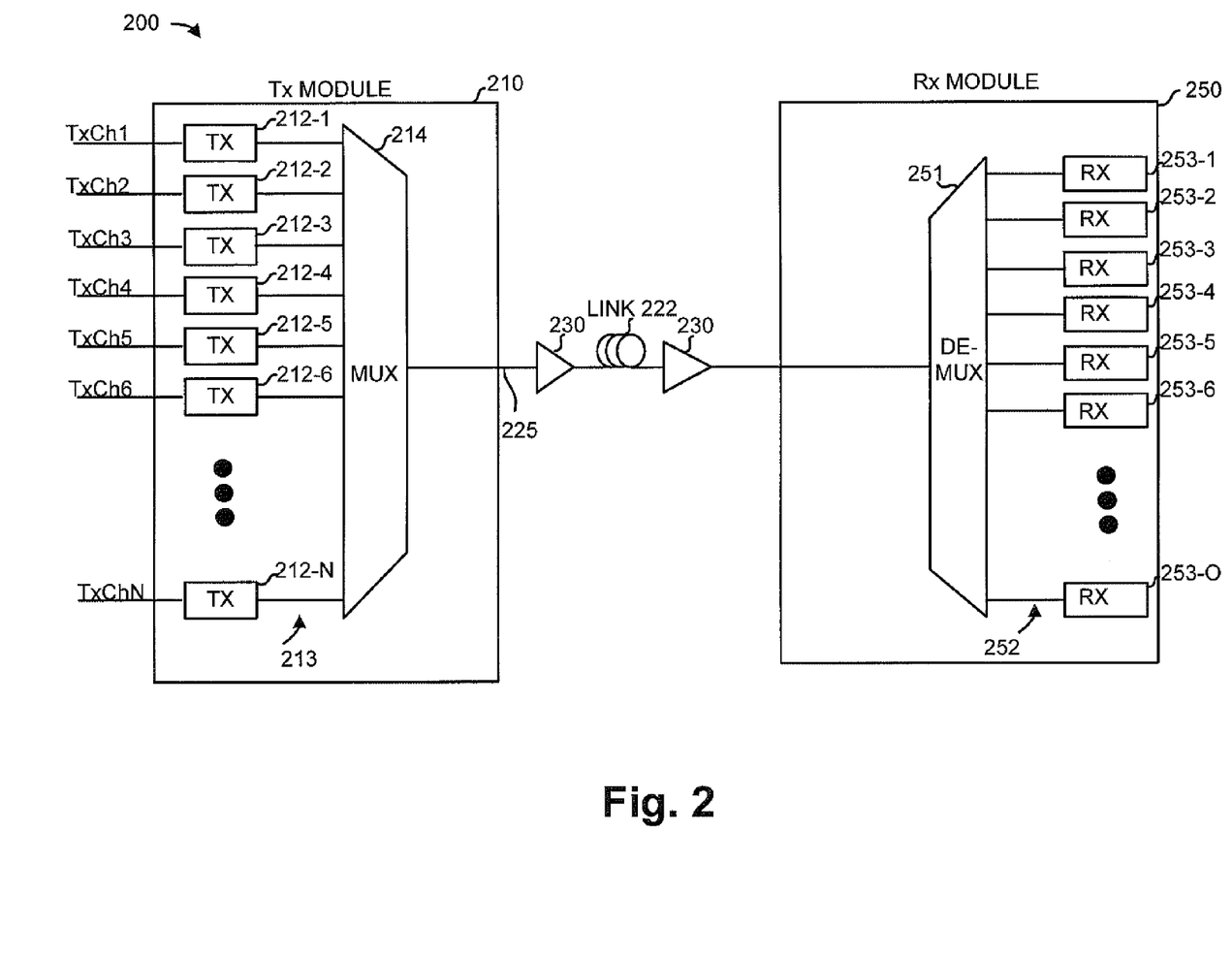
FIG. 2 is a diagram of an example network in which systems and/or methods, described herein, may be implemented.

FIG. 2 is a diagram of an example network 200 in which systems and/or methods, described herein, may be implemented. As illustrated in FIG. 2, network 200 may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (where N≥1), waveguides 213, and/or optical multiplexer 214. Each optical transmitter 212 may receive a data channel (TxCh1 through TxChN), modulate the data channel with an optical signal, and transmit the data channel as an optical signal. In one implementation, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP). and/or some other components. The laser, modulator, and/or SOA may be coupled with a tuning element (e.g., a heater) that can be used to tune the wavelength of an optical signal channel output by the laser, modulator, or SOA. In some implementations, a single laser may be shared by multiple optical transmitters 212.

Waveguides 213 may include an optical link to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-0 (where O≥1). In some implementations, optical demultiplexer 251 may include an AWG or some other device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be birefringent (e.g., based on the width of waveguides 252).

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

While FIG. 2 shows a particular configuration of components in network 200, in practice, network 200 may include additional components, different components, or differently arranged components than what are shown in FIG. 2.

Figure 3:
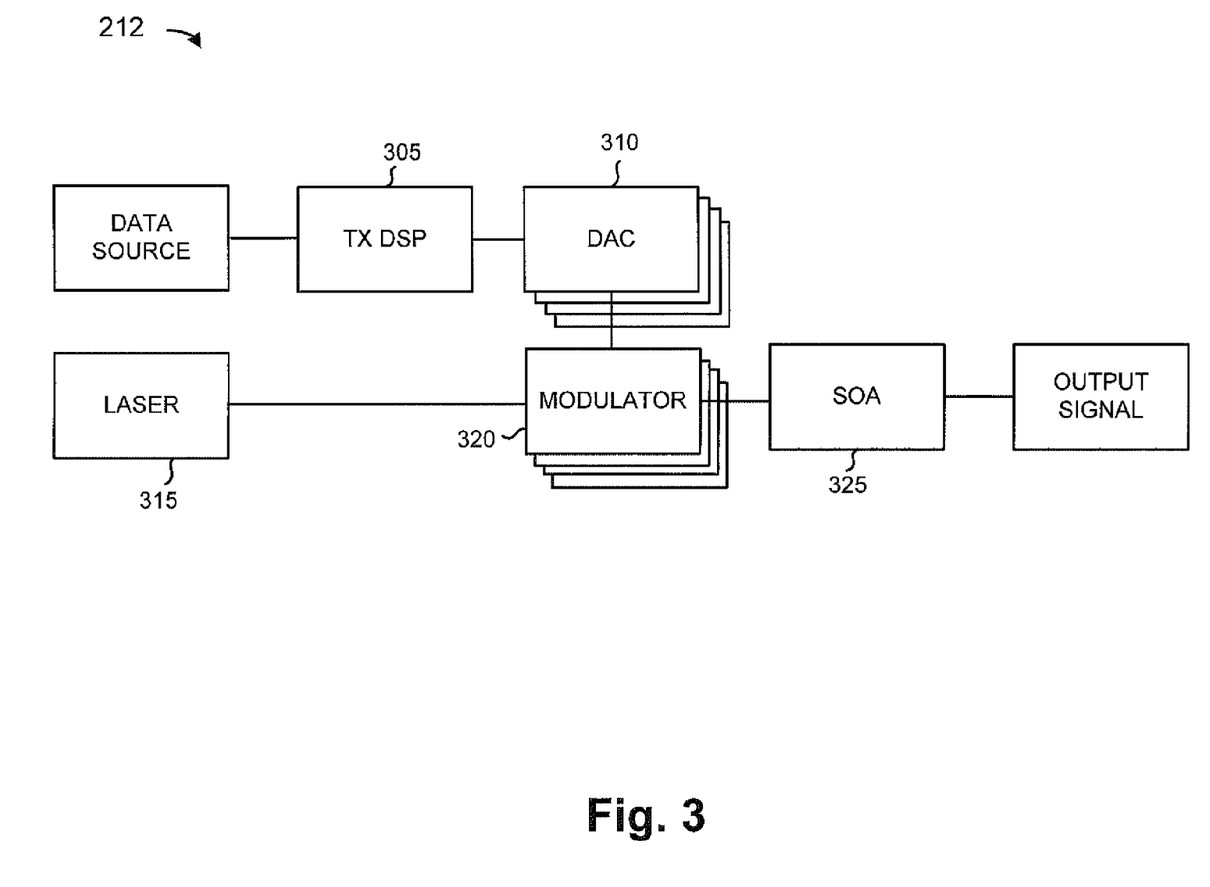
FIG. 3 is a diagram illustrating example components of an optical transmitter as shown in FIG. 2.

FIG. 3 is a diagram illustrating example elements of optical transmitter 212 as shown in network 200 of FIG. 2. As shown in FIG. 3, optical transmitter 212 may include TX digital signal processor (DSP) 305, digital-to-analog converters (DACs) 310, laser 315, modulator 320, and/or SOA 325. In some implementations, components of multiple optical transmitters 212 may be implemented on a single integrated circuit, such as a single PIC, to form a super-channel transmitter.

TX DSP 305 may include a digital signal processor or a collection of digital signal processors. In some implementations, TX DSP 305 may receive a data source (e.g., a signal received via a TX channel), process the signal, and output digital signals having symbols that represent components of the signal (e.g., an in-phase x-pol component, a quadrature (quad)-phase x-pol component, an in-phase y-pol component, and a quad-phase y-pol component). In some implementations, TX DSP 305 may digitally modulate the signal by mapping bits, associated with the signal, to the symbols. In some implementations, TX DSP 305 may digitally modulate the signal using a 5QAM modulation format or some other type of modulation format. In some implementations, TX DSP 305 may apply spectral shaping and/or perform filtering to the signal. Additional details regarding TX DSP 305 in the context of processing a 5QAM signal are described with respect to FIG. 4.

DACs 310 may include a signal converting device or a collection of signal converting devices. In some implementations DACs 310 may receive respective digital signals from TX DSP 305, convert the received digital signals to analog signals, and provide the analog signals to modulators 320. The analog signals may correspond to electrical signals (e.g., voltage) to drive modulators 320.

Laser 315 may include a semiconductor laser, such as a distributed feedback (DFB) laser, or some other type of laser. Laser 315 may provide an optical signal to modulator 320. In some implementations, laser 315 may be an optical source for a single corresponding optical transmitter 212. In some implementations, laser 315 may be an optical source that is shared by multiple optical transmitters 212.

Modulator 320 may include an optical modulator, such as an electro-absorption modulator (EAM), a pair of nested Mach-Zender modulators (MZMs) for each polarization, or some other type of modulator. Modulator 320 may control (modulate) the intensity, amplitude, and/or phase of an optical signal (e.g., supplied by laser 315) in order to convey data associated with the data source (e.g., via one or more optical carriers of the optical signal). For example, modulator 320 may modulate the input optical light (e.g., from laser 315) based on an input voltage signal associated with the data source (e.g., an input voltage provided by DACs 310) to form an output signal. As described below with respect to FIG. 5, the output signal may be provided to optical receiver 253 such that optical receiver 253 may compare the intensity, amplitude, and/or phase of the output signal to a reference signal in order to recover data carried by the output signal.

Modulator 320 may be formed as a waveguide with electrodes for applying an electric field, based on the input voltage signal, in a direction perpendicular to the light beam. Alternatively, modulator 320 may be implemented based on other modulation technologies, such as electro-optic modulation.

In some implementations, multiple modulators 320 may be provided to modulate signals associated with particular components. For example, a first modulator 320 may be provided to modulate an in-phase x-pol component, a second modulator 320 may be provided to modulate a quad-phase x-pol component, a third modulator 320 may be provided to modulate an in-phase y-pol component, and a fourth modulator may be provided to modulate a quad-phase y-pol component.

SOA 325 may include an amplifying device or a collection of amplifying devices. In some implementations, SOA 325 may include an amplifier that may directly amplify an input optical signal (e.g., a signal supplied by laser 315). In some implementations, SOA 325 may be replaced by a variable optical attenuator (VOA), or by an element that combines both an SOA and a VOA.

While FIG. 3 shows optical transmitter 212 as including a particular quantity and arrangement of components, in some implementations, optical transmitter 212 may include additional components, fewer components, different components, or differently arranged components.

Figure 4:
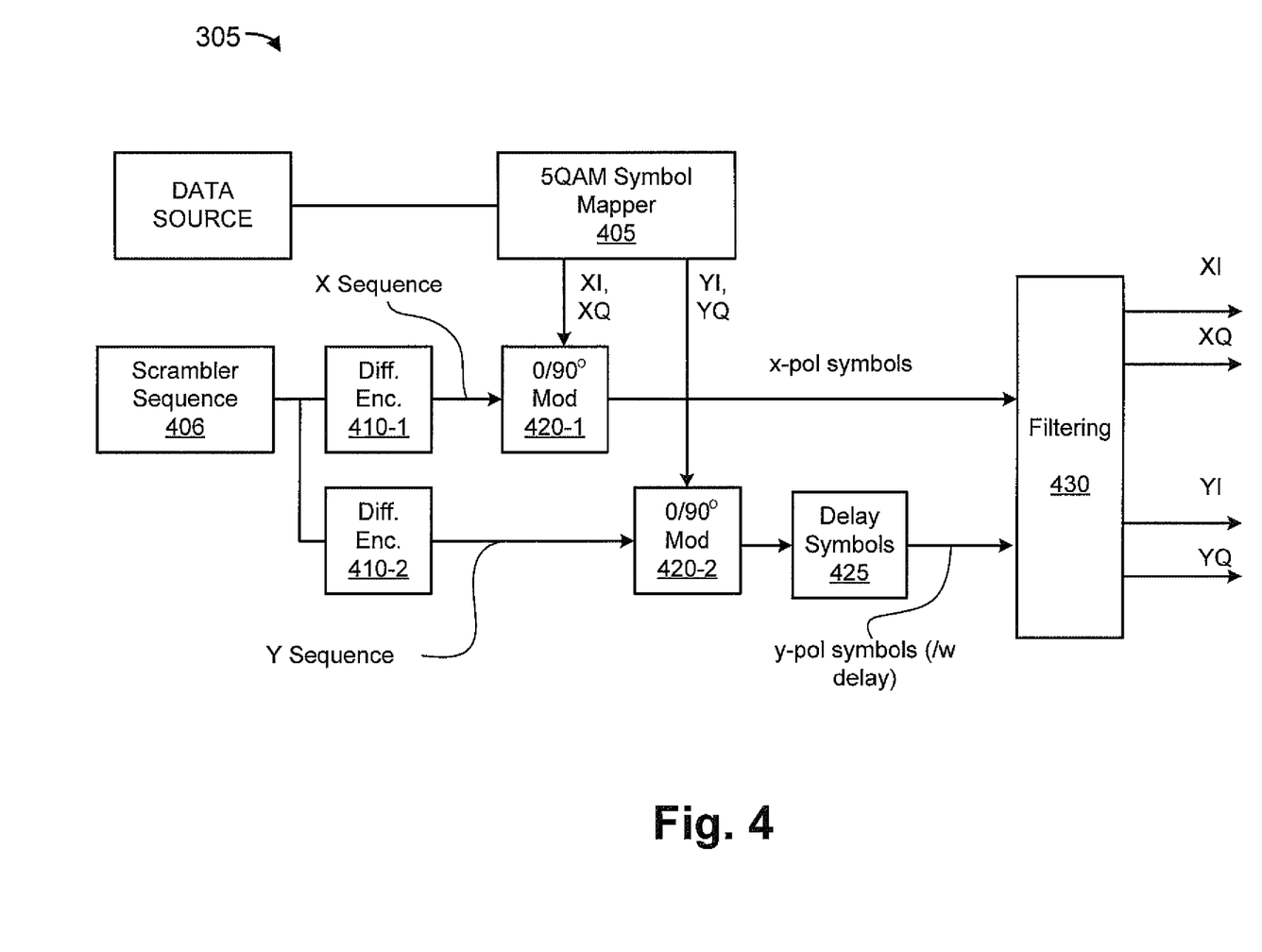
FIG. 4 illustrates example components of a transmitter digital signal processor.

FIG. 4 illustrates example components of TX DSP 305. As shown in FIG. 4, TX DSP 305 may include 5QAM symbol mapper 405, scrambler sequence component 406, differential encoder component 410, 0 degree/90 degree (0/90) modulator 420, delay symbols component 425, and filtering component 430.

5QAM symbol mapper 405 may receive a data source (e.g., a signal received via a TX channel) and may map bits, associated with the signal, to symbols. In some implementations, the signal may be provided as a dual-pol signal including 5 bits (e.g., using technique serial to parallel converter). In some implementations, the 5 bits may correspond to one of 32 5-bit words (e.g., since (2 values per bit)^(5 bits)=32). In some implementations, 5QAM symbol mapper 405 may map the 5-bit word to symbols representative of an in-phase x-pol component (XI), a quad-phase x-pol component (XQ), an in-phase y-pol component (YI), and a quad-phase y-pol component (YQ). For example, 5QAM symbol mapper 405 may map the 5-bit word to the symbols using a table. An example table that 5QAM symbol mapper 405 may use to map the 5-bit word to the symbols is shown below.

| 5 bit Word | XI | XQ | YI | YQ |
|---|---|---|---|---|
| 0 | −3 | −3 | −3 | −3 |
| 1 | −1 | −1 | −1 | −1 |
| 2 | −3 | −3 | −3 | 1 |
| 3 | −1 | −1 | −1 | 3 |
| 4 | −3 | −3 | 1 | −3 |
| 5 | −1 | −1 | 3 | −1 |
| 6 | −3 | −3 | 1 | 1 |
| 7 | −1 | −1 | 3 | 3 |
| 8 | −3 | 1 | −3 | −3 |
| 9 | −1 | 3 | −1 | −1 |
| 10 | −3 | 1 | −3 | 1 |
| 11 | −1 | 3 | −1 | 3 |
| 12 | −3 | 1 | 1 | −3 |
| 13 | −1 | 3 | 3 | −1 |
| 14 | −3 | 1 | 1 | 1 |
| 15 | −1 | 3 | 3 | 3 |
| 16 | 1 | −3 | −3 | −3 |
| 17 | 3 | −1 | −1 | −1 |
| 18 | 1 | −3 | −3 | 1 |
| 19 | 3 | −1 | −1 | 3 |
| 20 | 1 | −3 | 1 | −3 |
| 21 | 3 | −1 | 3 | −1 |
| 22 | 1 | −3 | 1 | 1 |
| 23 | 3 | −1 | 3 | 3 |
| 24 | 1 | 1 | −3 | −3 |
| 25 | 3 | 3 | −1 | −1 |
| 26 | 1 | 1 | −3 | 1 |
| 27 | 3 | 3 | −1 | 3 |
| 28 | 1 | 1 | 1 | −3 |
| 29 | 3 | 3 | 3 | −1 |
| 30 | 1 | 1 | 1 | 1 |
| 31 | 3 | 3 | 3 | 3 |

In some implementations, 5QAM symbol mapper 405 may use a different table than what is shown.

In some implementations, each of the 32 symbols (e.g., XI, XQ, YI, YQ) may be a 4-dimensional (4D) signal. A 5QAM signal may be selected such that a minimum squared Euclidean distance (MSED) among the 32 4D signals is 16, where the squared Euclidean distance between any two signals ($XI_1$, $XQ_1$, $YI_1$, $YQ_1$) and ($XI_2$, $XQ_2$, $YI_2$, $YQ_2$) is $(XI_1-XI_2)^2 + (XQ_1-XQ_2)^2 + (YI_1-YI_2)^2 + (YQ_1-YQ_2)^2$. As a comparison, a 16QAM signal (e.g., associated with either an X polarization or a Y polarization) may have an MSED value of 4.

As further shown in FIG. 4, 5QAM symbol mapper 405 may provide the XI and XQ symbols to 0/90 modulator 420-1, and may provide the YI and YQ symbols to 0/90 modulator 420-2.

Scrambler sequence component 406 may generate a sequence that may identify time instances when 0/90 modulators 420 are to rotate the symbols such that when the symbols are plotted on a constellation diagram, the constellation diagram of the 5QAM signal may substantially match a constellation diagram of a 16QAM signal. In some implementations, the sequence may be predetermined or may be random using a pseudo random binary sequence (PRBS) algorithm. In some implementations, scrambler sequence component 406 may provide a sequence destined for 0/90 modulator 420-1, and may provide a sequence destined for 0/90 modulator 420-2. In some implementations, the sequences may be differentially encoded by differential encoders 410 to reduce cycle slips of the 5QAM signal during transmission.

0/90 modulators 420 may receive symbols from 5QAM symbol mapper 405 and may receive scrambler sequences from scrambler sequence component 406 (e.g., via differential encoders 410). In some implementations, 0/90 modulators 420 may continuously rotate the symbols based on the scrambler sequences (e.g., at time instances corresponding to the scrambler sequences). As shown in FIG. 4, 0/90 modulator 420-1 may provide the x-pol symbols and 0/90 modulator 420-2 may provide the y-pol symbols. As a result of the continuous rotation, the constellation diagram of the 5QAM signal may substantially match the constellation diagram of a 16QAM signal.

Delay symbols component 425 may insert one or more symbols to delay the y-pol symbols relative to the x-pol symbols to create a polarization time skew. In some implementations, the polarization time skew may be introduced to decorrelate the x-pol and y-pol signals in order for receiver module 253 to equalize the 5QAM signal using an equalization technique for a 16QAM signal (e.g., a dual pole (DP) 16QAM signal). Alternatively, delay symbols component 425 may insert one or more symbols to delay the x-pol symbols relative to the y-pol symbols. The selection of delay symbols may be based on a receiver equalizer span associated with receiver module 253. As an example, a delay of 64 symbols may be used. In some implementations, a delay of some other quantity of symbols may be used.

Filtering component 430 may receive the x-pol symbols and the y-pol symbols and may perform filtering functions to provide digital signals having components corresponding to the x-pol symbols and the y-pol symbols (e.g., XI, XQ, YI, and YQ components). For example, filtering component 430 may convert the symbols to the frequency domain using a fast Fourier transform (FFT) component, apply spectral shaping while in the frequency domain, and return the symbols to the time domain using an inverse FFT (IFFT) component. In some implementations, filtering component 430 may include a look-up table to provide integers to DACs 310 based on samples received by the IFFT component corresponding to the symbols. As shown in FIG. 4, filtering component 430 may provide digital signals, corresponding to the XI, XQ, YI, and YQ components, to DACs 310.

In some implementations, DACs 310 may receive the digital signals and may convert the digital signals to corresponding analog signals. As described above, modulators 320 may receive the analog signals, modulate an optical signal (e.g., provided by laser 315) based on the analog signals, and form an output signal via SOA 325. The output signal may be transmitted via link 222 and may be a 16QAM-equivalent signal (e.g., a 5QAM signal that is associated with a constellation diagram that substantially matches a 16QAM constellation diagram). For example, as described above, the constellation diagram of the 16QAM-equivalent signal may substantially matches the constellation diagram of a 16QAM signal as a result of the continuous rotation of the XI, XQ, YI, and YQ symbols. In some implementations, the 16QAM-equivalent signal may correspond to an input signal received by optical receiver 253.

While FIG. 4 shows TX DSP 305 as including a particular quantity and arrangement of functional components, in some implementations, TX DSP 305 may include additional functional components, fewer functional components, different functional components, or differently arranged functional components.

Figure 5:
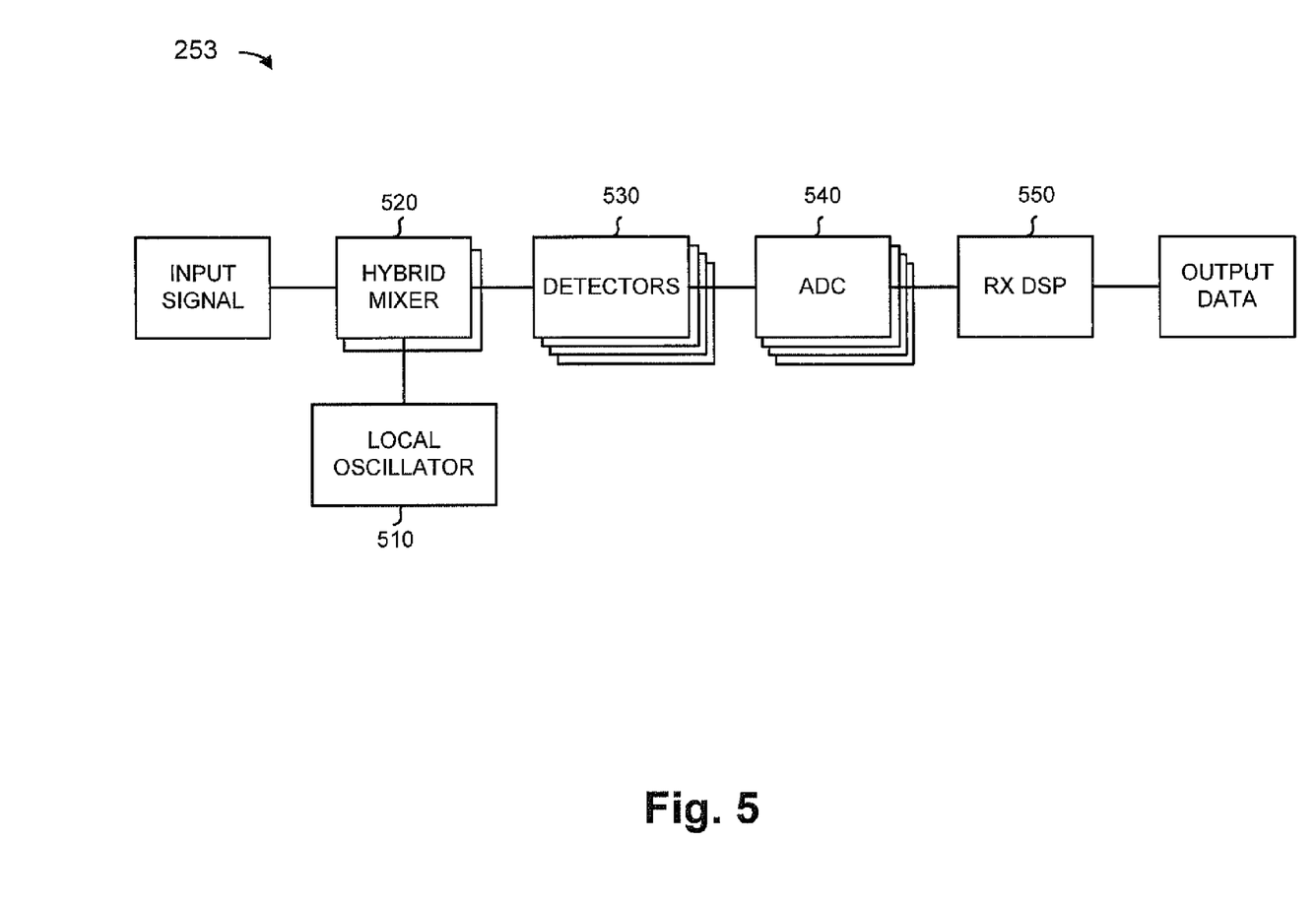
FIG. 5 is a diagram illustrating example components of an optical receiver as shown in FIG. 2.

FIG. 5 is a diagram illustrating example elements of optical receiver 253 as shown in network 200 of FIG. 2. As shown in FIG. 5, optical receiver 253 may include local oscillator 510, hybrid mixer 520, detectors 530, analog-to-digital convert (ADC) 540, and/or RX digital signal processor (DSP) 370. In some implementations, local oscillator 510, hybrid mixer 520, and detectors 530 may be implemented on a single integrated circuit, such as a single PIC. In some implementations, ADC 540 and RX DSP 550 may be implemented using an application specific integrated circuit (ASIC) and/or may be implemented on a single integrated circuit, such as a single PIC. In some other implementations, local oscillator 510, hybrid mixer 520, detectors 530, ADC 540, and/or RX DSP 550 may be implemented on one or more integrated circuits, such as one or more PICs.

Local oscillator 510 may include a laser device or a collection of laser devices. In some implementations, local oscillator 510 may provide a reference signal to hybrid mixer 520. In some implementations, local oscillator 510 may include a single-sided laser to provide an optical signal to hybrid mixer 520. In some other implementations, local oscillator 510 may include a double-sided laser to provide multiple optical signals to multiple hybrid mixers 520. In some implementations, a phase, intensity, and/or amplitude of the reference signal may be compared to a phase, intensity, and/or amplitude of an input signal (e.g., a WDM signal supplied by optical demultiplexer 251 and corresponding to a 16QAM-equivalent output signal provided by transmitter module 212) to recover data carried by the input signal.

Hybrid mixer 520 may include one or more optical devices to receive an input signal (e.g., a WDM signal supplied by optical demultiplexer 251 and corresponding to a 16QAM-equivalent output signal provided by transmitter module 212). In some implementations, hybrid mixer 520 may receive a reference signal from local oscillator 510. In some implementations, hybrid mixer 520 may supply components associated with the input signal and the reference optical signal to detectors 530. For example, hybrid mixer 520 may supply an in-phase x-pol component, a quad-phase x-pol component, an in-phase y-pol component, and a quad-phase y-pol component. In some implementations, a first hybrid mixer 520 may provide the in-phase x-pol component and the quad-phase x-pol component, and a second hybrid mixer 520 may provide the in-phase y-pol component and the quad-phase y-pol component.

Detectors 530 may include one or more photodetectors, such as a photodiode, to receive the output optical signal, from hybrid mixer 520, and convert the output optical signal to corresponding voltage signals. In some implementation, optical receiver 253 may include multiple detectors for in-phase x-pol components, quad-phase x-pol components, in-phase y-pol components, and quad-phase y-pol components. In some implementations, detectors 530 may include one or more balanced pairs of photodetectors. For example, detectors 530 may include a first pair of photodetectors to receive an in-phase x-pol component, a second pair of photo detectors to receive a quad-phase x-pol component. Additionally, detectors 530 may include a third pair of photodetectors to receive an in-phase y-pol component and a fourth pair of photodetectors to receive a quad-phase y-pol component.

ADC 540 may include an analog-to-digital converter that converts the voltage signals from detectors 530 to digital signals. ADC 540 may provide the digital signals to RX DSP 550. In some implementations, optical receiver 253 may include four ADCs 540 or some other number of ADCs 540 (e.g., one ADC 540 for each electrical signal output by detectors 530). In some implementations, the digital signals may be 16QAM-equivalent signals corresponding to the input signal.

RX DSP 550 may include a digital signal processing device or a collection of digital signal processing devices. In some implementations, RX DSP 550 may receive digital signals from ADC 540 and may process the digital signals to form output data associated with the input signal received by hybrid mixer 520. In some implementations, RX DSP 550 may equalize the digital signals using a 16QAM equalization algorithm (e.g., an adaptive algorithm), and convert the digital signals from a 16QAM format to a 5QAM format to recover output data from the input signal received by hybrid mixer 420. Additional details regarding RX DSP 550 are described with respect to FIG. 6.

While FIG. 5 shows optical receiver 253 as including a particular quantity and arrangement of components, in some implementations, optical receiver 253 may include additional components, fewer components, different components, or differently arranged components. For example, optical receiver 253 may include a chromatic dispersion compensating component and/or some other component to compensate for dispersion associated with digital signals provided by ADCs 540.

Figure 6:
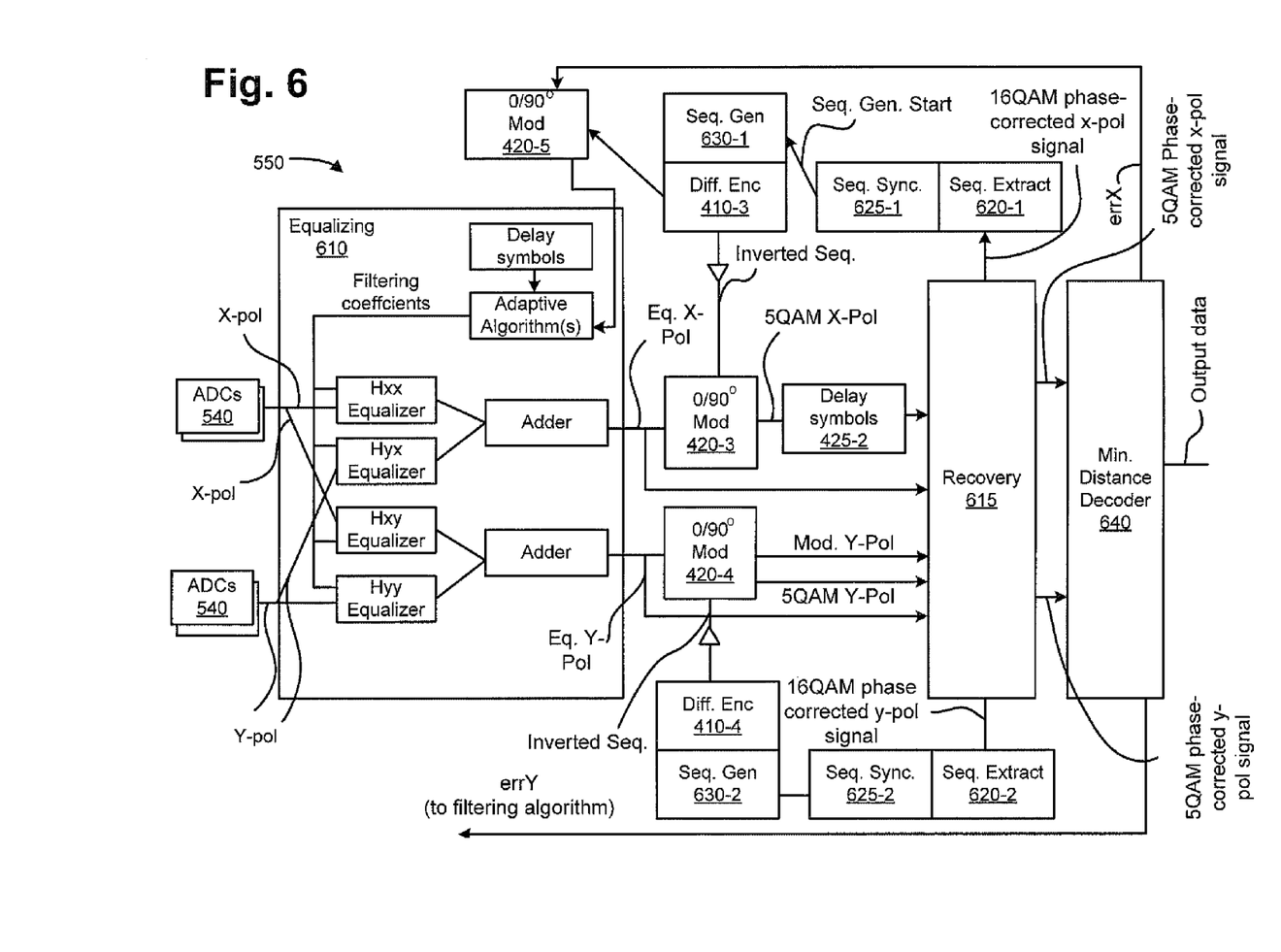
FIG. 6 illustrates example components of a receiver digital signal processor.

FIG. 6 illustrates example components of RX DSP 550. As shown in FIG. 6, RX DSP 550 may include equalizing component 610, recovery component 615, sequence extractor 620, sequence synchronizer 625, sequence generator 630, and minimum distance decoder 640. As further shown in FIG. 6, RX DSP 550 may include differential encoder 410, 0/90 modulator 420, and delay symbols component 425, as described above with respect to FIG. 4.

Equalizing component 610 may include filtering algorithms, equalizers, adders, and/or some other components to receive a signal, filter the signal to remove undesired components having a particular polarization, and provide an equalized signal.

Recovery component 615 may receive a signal and may perform phase correction to remove phase noise from the signal (e.g., phase noise associated with Tx and Rx lasers, such as laser 315 and/or local oscillator 510). In some implementations, recovery component 615 may operate in different modulation modes, such as a 5QAM modulation mode, a 16QAM modulation mode, or some other modulation mode. In some implementations, recovery component 615 may output a phase-corrected signal to allow minimum distance decoder 640 to identify bits associated with the phase-corrected signal. In some implementations, recovery component 615 may perform differential decoding (e.g., when a sequence, associated with the signal, has been differentially encoded by differential encoder 420-1 and/or differential encoder 420-2).

Sequence extractor 620 may receive a signal and may extract a sequence of bits associated with the signal. In some implementations, sequence extractor 620 may identify a measure of detection strength of the bits.

Sequence synchronizer 625 may identify a scrambler sequence based on the sequence of bits extracted by sequence extractor 620. For example, sequence synchronizer 625 may convolve the sequence of bits extractor 620 with a sequence locally stored by sequence synchronizer 625 in order to align the locally stored sequence against the sequence of bits extracted by sequence extractor 620 and to identify a scrambler sequence. In some implementations, sequence synchronizer 625 may identify the scrambler sequence using some other technique. In some implementations, sequence synchronizer 625 may identify the scrambler sequence based on a portion of the sequence of bits extracted from sequence extractor 620. Sequence generator 630 may generate a scrambler sequence based the scrambler sequence identified by sequence synchronizer 625.

Minimum distance decoder 640 may receive a signal, identify XI, XQ, YI, and YQ symbols associated with the signal, and identify a corresponding 5-bit word associated with the XI, XQ, YI, and YQ symbols. For example, minimum distance decoder 640 may perform a function that is inverse to 5QAM symbol mapper 405 and may store a table corresponding to the table stored by 5QAM symbol mapper 405.

In some implementations, minimum distance decoder 640 may calculate an error value that corresponds to a likelihood that the 5-bit word is correctly identified. For example, the error value may correspond to a distance between a first constellation point and a second constellation point. In some implementations, the first constellation point may correspond to identified XI and XQ components and the second constellation point may correspond to known XI and XQ components (e.g., based on the table stored by minimum distance decoder 640).

In FIG. 6, assume that RX DSP 550 receives signals from ADCs 540 and that the signals correspond to a 16QAM-equivalent signal provided by optical transmitter 212. In some implementations, RX DSP 550 may include chromatic dispersion compensator (CDEQ) components. For example, RX DSP 550 may include a first CDEQ unit to receive x-pol signals and a second CDEQ component to receive y-pol signals (e.g., signals with components having the x-polarization and the y-polarization, respectively) to compensate for chromatic dispersion associated with signals provided by ADCs 540.

As shown in FIG. 6, ADCs 540 may provide x-pol and y-pol signals, corresponding to the 16QAM-equivalent signal, to equalizing component 610 (e.g., via CDEQ components). As shown in FIG. 6, equalizing component 610 may include an Hxx equalizer, an Hyx equalizer, an Hxy equalizer, and an Hyy equalizer.

In some implementations, the Hxx equalizer may receive the x-pol signal, filter the x-pol signal and output a first filtered x-pol signal. In some implementations, the Hyx equalizer may receive the y-pol signal, filter the y-pol signal and output a second filtered x-pol signal. The outputs of the Hxx equalizer and the Hyx equalizer may be provided to an adder component. The adder component may add the first filtered x-pol signal and the second filtered x-pol signal to form an equalized x-pol signal.

In some implementations, the Hxy equalizer may receive the x-pol signal, filter the x-pol signal and output a first filtered y-pol signal. In some implementations, the Hyy equalizer may receive the y-pol signal, filter the y-pol signal and output a second filtered y-pol. The outputs of the Hxy equalizer and the Hyy equalizer may be provided to an adder component. The adder component may add the first filtered y-pol signal and the second filtered y-pol signal to form an equalized y-pol signal.

In some implementations, the Hxx, the Hyx, the Hxy, and the Hyy equalizers may filter received signals based on filtering coefficients provided by a filtering algorithm component. As described in greater detail below, the filtering algorithm may receive delay symbols and a modulated error value to form the filtering coefficients.

As shown in FIG. 6, the equalized x-pol signal may be provided to recovery component 615. In some implementations, recovery component 615 may be programmed in 16QAM mode to form a 16QAM phase-corrected x-pol signal corresponding to the 16QAM-equivalent signal. For example, recovery component 615 may receive the equalized x-pol signal and synchronize a carrier phase of the x-pol signal (e.g., to remove phase noise associated with Tx and Rx lasers, such as laser 315 and/or local oscillator 510) to form the 16QAM phase-corrected x-pol signal corresponding to the x-pol signal.

In some implementations, sequence extractor 620-1 may use bits from the 16QAM phase-corrected x-pol signal to extract a sequence (e.g., a sequence corresponding to a scrambler sequence provided by scrambler sequence component 406). In some implementations, sequence extractor 620-1 may extract the sequence by decoding symbols associated with the bits of the 16QAM phase-corrected x-pol signal. As described above, a 16QAM-equivalent signal (e.g., corresponding to the 16QAM phase-corrected x-pol signal) may include symbols associated with a 16QAM constellation when symbols from a 5QAM signal are periodically rotated. That is, at different instances in time, the 16QAM-equivalent signal may include either rotated symbols or non-rotated symbols such that over a period of time, the 16QAM-equivalent signal may include both rotated and non-rotated symbols.

In some implementations, sequence extractor 620-1 may decode the value "1" when the 16QAM phase-corrected x-pol signal includes only non-rotated symbols. In some implementations, sequence extractor 620 may decode the value "0" when the 16QAM phase-corrected x-pol signal includes only rotated symbols. Alternatively, sequence extractor 620 may decode the value "0" when the 16QAM phase-corrected x-pol signal includes only non-rotated symbols and may decode the value "1" when the 16QAM phase-corrected x-pol signal includes only rotated symbols.

As an example, sequence extractor 620-1 may decode 64 bits for 64 input signals (e.g., 16QAM phase-corrected x-pol signals). In some implementations, the 64 bits may constitute one period of a scrambling sequence. In some implementations, sequence extractor 620 may measure a strength of detection of each period.

Sequence synchronizer 625-1 may identify the start of the scrambling sequence based on the sequence of bits decoded by sequence extractor 620-1. For example, sequence synchronizer 625-1 may identify the start of the scrambling sequence based on the period of the scrambling sequence that has a substantially higher measure of detection strength than other periods of the scrambler sequence. The start of the scrambler sequence, identified by sequence synchronizer 625-1, may correspond to the start of the scrambler sequence generated by scrambler sequence component 406. Sequence generator 630-1 may generate a scrambler sequence based on the sequence, identified by sequence extractor 620-1, and the start of the scrambler sequence identified by sequence synchronizer 625-1. In some implementations, sequence generator 630-1 may provide an instruction to cause recovery component 615 to switch to a 5QAM recovery mode (e.g., when sequence generator 630-1 generates the scrambler sequence). As described in greater detail below, recovery component 615 may provide a 5QAM phase-corrected when in the 5QAM recovery mode.

In some implementations, the scrambler sequence, provided by sequence generator 630-1, may be differentially encoded by differential encoder 410-3 to form a differentially encoded scrambler sequence (e.g., such that the scrambler sequence matches a differentially encoded format associated with the scrambler sequence provided by scrambler sequence component 406 and differentially encoded by differential encoder 410-1).

In some implementations, the differentially encoded scrambler sequence may be inverted by an inverter to form an inverted scrambler sequence. In some implementations, the inverted scrambler sequence may be provided to 0/90 modulator 420-3. In some implementations, 0/90 modulator 420-3 may receive the inverted scrambler sequence and an equalized x-pol signal (e.g., corresponding to a 16QAM-equivalent signal). In some implementations, 0/90 modulator 420-3 may reverse the rotation on the 16QAM-equivalent signal (e.g., the periodic rotation executed by 0/90 modulator 420-1 in TX DSP 305) to revert the 16QAM-equivalent to an original 5QAM signal corresponding to XI and XQ symbols provided by 5QAM mapper 405 on TX DSP 305 (shown as a 5QAM x-pol signal in FIG. 6).

In some implementations, the 5QAM x-pol signal may be provided to delay symbols component 425-2 to revert a timing skew introduced by delay symbols component 425 on TX DSP 305. In some implementations, the 5QAM x-pol symbol may be provided to recovery component 615 to form a 5QAM phase-corrected x-pol signal. For example, recovery component 615 may be switched to a 5QAM recovery mode to synchronize a carrier wave, associated with the 5QAM x-pol signal, and to remove phase noise.

In some implementations, the 5QAM phase-corrected x-pol signal may be provided to minimum distance decoder 640. In some implementations, minimum distance decoder 640 identify XI and XQ symbols associated with the 5QAM phase-corrected x-pol signal and may calculate an error value, associated with the 5QAM phase-corrected x-pol corresponding to a distance between a first constellation point and a second constellation point. In some implementations, the first constellation point may correspond to identified XI and XQ components and the second constellation point may correspond to known YI and YQ components (e.g., based on the table stored by minimum distance decoder 640).

In some implementations, the error of the 5QAM phase-corrected x-pol signal (e.g., errX) may be provided to 0/90 modulator 420-5 such that the error may be periodically rotated (e.g., based on a scrambler sequence provided by sequence generator 630-1 and differential encoder 410-3) to match a format of the scrambler sequence provided at TX DSP 305 by scrambler sequence 406 and rotated by 0/90 modulator 420-1. In some implementations, the error (e.g., based on being periodically rotated) may be provided to an adaptive algorithm component of equalizing component 610.

In some implementations, the adaptive algorithm may receive delay symbols corresponding to delay symbols provided by delay symbol component 425 (e.g. to revert a timing skew introduced by delay symbol component 425 at TX DSP 305). Based on the error and the delay symbols, the adaptive algorithm may provide filtering coefficients that the Hxx equalizer, the Hyx equalizer, the Hxy equalizer, and the Hyy equalizer may use to filter input x-pol and y-pol signals. In some implementations, the filtering coefficients may be initially predetermined and may converge towards a particular value as input signals are provided and processed through RX DSP 550 as described. In some implementations, the filtering algorithm may be a CMA algorithm, an LMS algorithm, and/or some other type of algorithm.

In some implementations, components of RX DSP 550 may perform similar functions to an equalized y-pol signal as those functions performed with regard to an equalized x-pol signal. For example, recovery component 615 may receive the equalized y-pol signal and provide a 16QAM phase-corrected y-pol signal to sequence extractor 620-2. Sequence extractor 620-2, sequence synchronizer 625-2, sequence generator 630-2, and differential encoder 410-4 may perform similar function as sequence extractor 620-1, sequence synchronizer 625-1, sequence generator 630-1, and differential encoder 410-3, respectively, to form an inverted scrambler sequence. 0/90 modulator 420-4 may perform similar functions as 0/90 420-3 to revert the equalized y-pol symbol from a 16QAM equivalent signal to an original 5QAM signal. In some implementations, recovery component 615 may provide a 5QAM phase-corrected y-pol signal to minimum distance decoder 640 and may determine an error associated with the 5QAM phase-corrected y-pol signal (e.g., errY). In some implementations, errY may be provided to an adaptive algorithm, associated with equalizing component 610 so that filtering algorithm may generate filtering coefficients based on errY. In some implementations, minimum distance decoder 640 may determine an error associated with a 4D signal and/or provide data associated with the 4D signal.

In some implementations, minimum distance decoder 640 may receive a 5QAM phase-corrected x-pol signal and a 5QAM phase-corrected y-pol signal (e.g., in accordance with processes described above). In some implementations, minimum distance decoder 640 may identify XI, XQ, YI, and YQ symbols associated with the 5QAM phase-corrected x-pol signal and the 5QAM phase-corrected y-pol signal, and identify a corresponding 5-bit word associated with the XI, XQ, YI, and YQ symbols. For example, as described above, minimum distance decoder 640 may perform a function that is inverse to 5QAM symbol mapper 405. In some implementations, minimum distance decoder 640 may provide output data corresponding to the 5-bit word which may correspond to the 5-bit word associated with a data source received by 5QAM symbol mapper 405 at TX DSP 305.

While FIG. 6 shows RX DSP 550 as including a particular quantity and arrangement of components, in some implementations, RX DSP 550 may include additional components, fewer components, different components, or differently arranged components.

As described above, a dual-pol 5QAM signal (e.g., a signal that is modulated using a 5QAM modulation format that delivers 5 bits per dual-pol symbol) may be equalized such that data from the signal may be recovered by a receiver. As described above, the 5QAM signal may be continuously rotated to form a 16QAM-equivalent signal such that an equalization algorithm (e.g., an algorithm formatted to equalize a dual-pol 16QAM signal) may be used to equalize 5QAM signal, correct a phase of the 5QAM signal, and recover data from the 5QAM signal.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. An optical system, comprising:
   an optical transmitter comprising:
      a laser configured to provide an input signal;
      a digital signal processor (DSP) configured to:
         receive a data signal,
         provide non-rotated symbols corresponding to components of the data signal,
            the non-rotated symbols corresponding to first points in a constellation map, rotate the non-rotated symbols to provide rotated symbols, the rotated symbols corresponding to second points in the constellation map that are rotated relative to the first points of the constellation map, and provide digital signals corresponding to the non-rotated symbols and the rotated symbols to cause one or more digital to analog converts (DACs) to convert the digital signals to corresponding analog signals; and one or more modulators configured to receive the input signal and the analog signals and provide a modified 5 quadrature amplitude modulation (5QAM) output signal based on the input signal and the analog signals, a constellation map of the modified 5QAM output signal including all constellation points of a 16QAM signal.

2. The optical system in accordance with claim 1, where the DSP is further configured to:

generate a scrambler sequence, where when rotating the non-rotated symbols, the DSP is further configured to rotate the non-rotated symbols based on the scrambler sequence.

3. The optical system in accordance with claim 1, where when rotating the non-rotated symbols to form the rotated symbols, the DSP is further configured to rotate the non-rotated symbols by 90 degrees.

4. The optical system in accordance with claim 1, where the DSP is further configured to:

insert one or more delay symbols to the non-rotated symbols or the rotated symbols where when providing the digital signals corresponding to the non-rotated symbols and the rotated symbols, the DSP is further configured to provide the digital signals based on inserting the one or more delay symbols.

5. The optical system in accordance with claim 1, where the DSP is a first DSP, the optical system further comprising:

an optical receiver comprising:

a second DSP configured to:

receive components associated with the modified 5QAM output signal, filter the components of the modified 5QAM output signal and reduce a phase noise of the modified 5QAM output signal to equalize the modified 5QAM output signal, and provide data associated with the modified 5QAM output signal via a minimum distance decoder and based on equalizing the components of the modified 5QAM output signal.

6. The optical system in accordance with claim 5, where the second DSP is further configured to:

equalize the components of the modified 5QAM output signal based on a 16QAM equalization algorithm, a constant modulus algorithm (CMA), or a least means square (LMS) algorithm.

7. The optical system in accordance with claim 5, where the second DSP is further configured to:

equalize the components of the modified 5QAM output signal based on a filtering coefficient, the filtering coefficient corresponding to error values associated with the components of the modified 5QAM output signal.

8. The optical system in accordance with claim 5, where the second DSP is further configured to:

reverse a rotation of the rotated symbols, where when providing the data associated with the modified 5QAM output signal, the second DSP is further configured to output the data based on reversing the rotation of the rotated symbols.

9. An optical system comprising:

an optical receiver comprising:

a digital signal processor (DSP) configured to:

receive components associated with a modified 5 quadrature amplitude modulation (5QAM) signal provided by an optical transmitter, a constellation map of the modified 5QAM output signal including all constellation points of a 16QAM signal, filter the components of the modified 5QAM signal and reduce a phase noise of the modified 5QAM signal to equalize the modified 5QAM signal, form a 5QAM signal associated with the modified 5QAM signal, based on equalizing the modified 5QAM signal, and provide data associated with the 5QAM signal based on forming the 5QAM signal.

10. The optical system in accordance with claim 9, where the DSP is further configured to:

equalize the components of the modified 5QAM signal based on a 16QAM equalization algorithm, a constant modulus algorithm (CMA), or a least means square (LMS) algorithm.

11. The optical system in accordance with claim 9, where the DSP is further configured to:

equalize the components of the modified 5QAM signal based on a filtering coefficient, the filtering coefficient corresponding to error values associated with the components of the modified 5QAM signal.

12. The optical system in accordance with claim 9, where the DSP is further configured to:

rotate symbols associated with the components of the modified 5QAM signal at time instances corresponding to a scrambler sequence to form rotated symbols, the rotated symbols corresponding to first points in a constellation map that are rotated relative to the seconds points of the constellation map;

where when forming the 5QAM signal, the second DSP is further configured to form the 5QAM signal further based on rotating the symbols.

13. An optical system, comprising:

an optical transmitter comprising:

a laser configured to provide an input signal;

a first digital signal processor (DSP) configured to:

receive a data signal, provide non-rotated symbols corresponding to components of the data signal, the non-rotated symbols corresponding to first points in a constellation map rotate the non-rotated symbols to provide rotated symbols the non-rotated symbols corresponding to first points in a constellation map, and provide digital signals corresponding to the non-rotated symbols and the rotated symbols to cause one or more digital to analog converts (DACs) to convert the digital signals to corresponding analog signals;

one or more modulators configured to receive the input signal and the analog signals and provide a modified 5 quadrature amplitude modulation (5QAM) output signal based on the input signal and the analog signals,
a constellation map of the modified 5QAM output signal including all constellation points of a 16QAM signal; and
an optical receiver comprising:
a second DSP configured to:
receive components associated with the 5QAM output signal,
filter the components of the 5QAM output signal and reduce a phase noise of the 5QAM output signal to equalize the 5QAM output signal, and
provide data associated with the 5QAM output signal based on equalizing the components of the 5QAM output signal.

14. The optical system in accordance with claim 13, where the first DSP is further configured to:
generate a scrambler sequence,
where when rotating the non-rotated symbols, the first DSP is further configured to rotate the non-rotated symbols based on the scrambler sequence.

15. The optical system in accordance with claim 13, where when rotating the non-rotated symbols to form the rotated symbols, the first DSP is further configured to rotate the non-rotated symbols by 90 degrees.

16. The optical system in accordance with claim 13, where the first DSP is further configured to:
insert one or more delay symbols to the non-rotated symbols or the rotated symbols,
where when providing the digital signals corresponding to the non-rotated symbols and the rotated symbols, the first DSP is further configured to provide the digital signals based on inserting the one or more delay symbols.

17. The optical system in accordance with claim 13, where the second DSP is further configured to:
equalize the components of the 5QAM output signal based on a 16QAM equalization algorithm, a constant modulus algorithm (CMA), or a least means square (LMS) algorithm.

18. The optical system in accordance with claim 13, where the second DSP is further configured to:
equalize the components of the 5QAM output signal based on a filtering coefficient,
the filtering coefficient corresponding to error values associated with the components of the 5QAM output signal.

19. The optical system in accordance with claim 13, where the second DSP is further configured to:
reverse a rotation of the rotated symbols,
where when providing the data associated with the 5QAM output signal, the second DSP is further configured to output the data based on reversing the rotation of the rotated symbols.

20. The optical system in accordance with claim 19, where when reversing the rotation of the rotated symbols, the second DSP is further configured to reverse the rotation of the rotated symbols based on a scrambler sequence used by the first DSP to form the rotated symbols.

* * * * *